Figure 1:
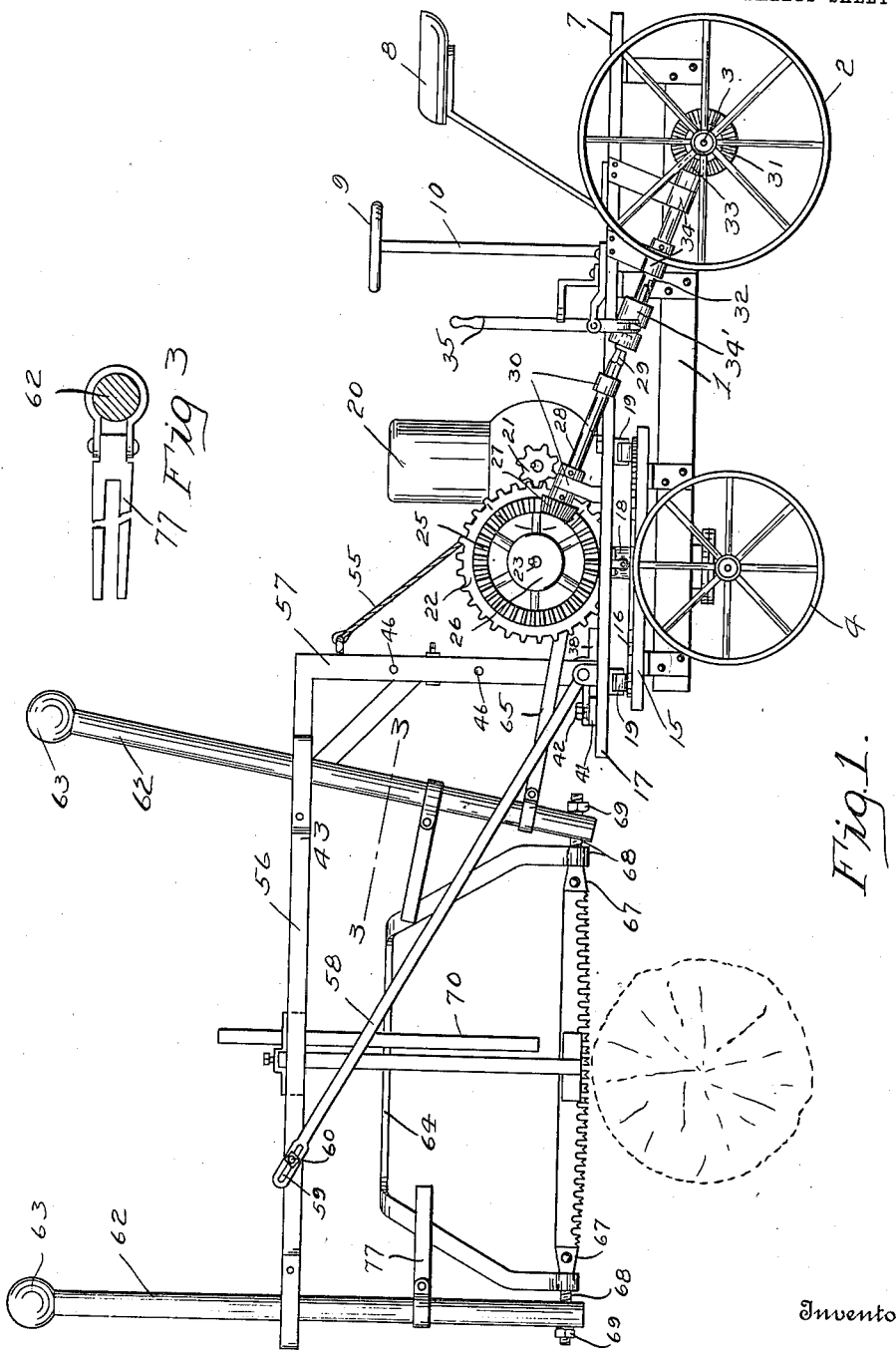

A. BRAZIER.
SAW.
APPLICATION FILED FEB. 23, 1912.

1,060,157.

Patented Apr. 29, 1913.

3 SHEETS—SHEET 1.

Witnesses
W. A. Stock
F. P. Schroeder.

Inventor
ALEXANDER BRAZIER
By Harry P. Schroeder
his Attorney

A. BRAZIER.
SAW.
APPLICATION FILED FEB. 23, 1912.
1,060,157.
Patented Apr. 29, 1913.
3 SHEETS—SHEET 2.
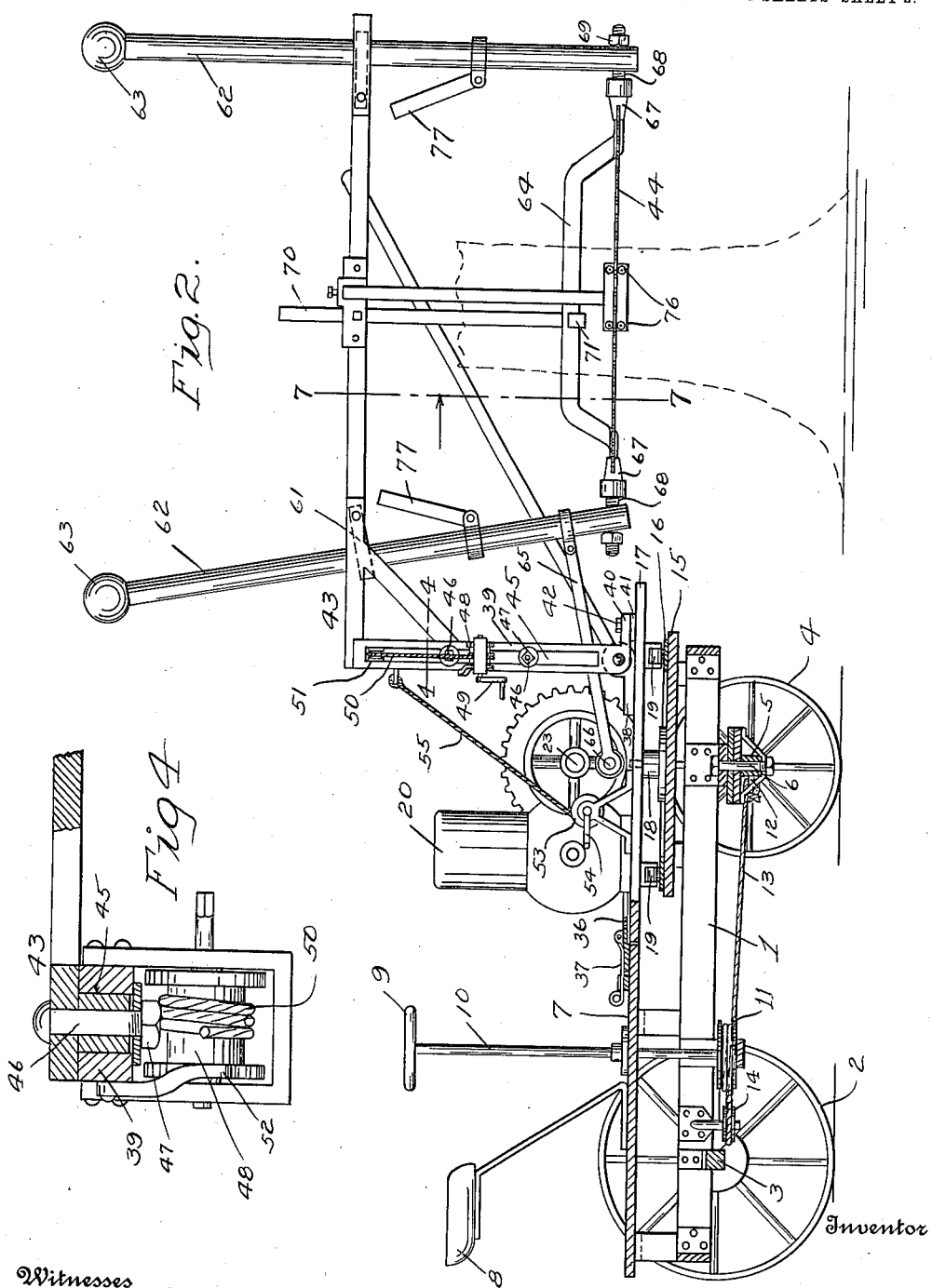
Witnesses
H. A. Stock
F. P. Schroeder
Inventor
ALEXANDER BRAZIER
By Harry C. Schroeder
his Attorney

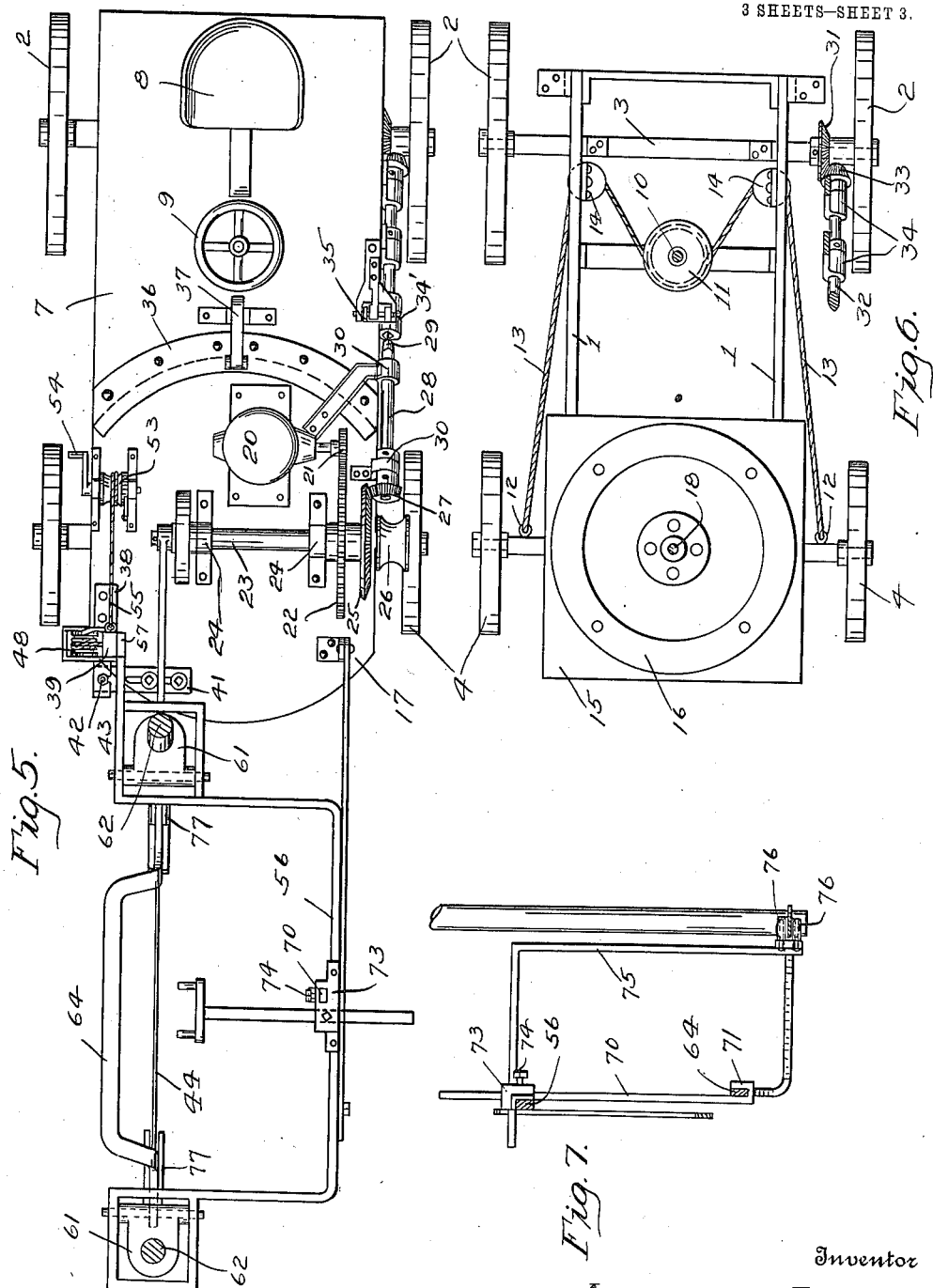

UNITED STATES PATENT OFFICE.

ALEXANDER BRAZIER, OF OAKLAND, CALIFORNIA.

SAW.

1,060,157. Specification of Letters Patent. Patented Apr. 29, 1913.

Application filed February 23, 1912. Serial No. 679,310.

*To all whom it may concern:*

Be it known that I, ALEXANDER BRAZIER, citizen of the United States, residing at Oakland, in the county of Alameda and State of California, have invented certain new and useful Improvements in Saws, of which the following is a specification.

My present invention relates to portable cross-cut saw-mills, in which movement, for sawing, is imparted to the cross cut saw by mechanical means, the saw and parts appertaining thereto being carried by a suitable vehicle.

The principal objects of my invention are to adapt the mill for both felling trees and cutting the trunks or limbs transversely, into logs, when such is desired, and to so dispose the motion producing means of the saw, and appertaining parts, that it may be adapted to move the vehicle, carrying the mechanism, from place to place.

Further objects of my invention will be set forth in the following detailed description, and more particularly pointed out in and by the appended claims.

In the drawings, forming a part of this specification: Figure 1 is a side elevation of the mill, the saw being arranged for cutting the trunk into logs. Fig. 2 is a view similar to Fig. 1, looking at the other side of the mill, and disclosing the saw arranged for cutting the standing trees. Fig. 3 is a sectional view on the line 3—3 of Fig. 1. Fig. 4 is a sectional view on the line 4—4 of Fig. 2. Fig. 5 is a top plan view of the mill. Fig. 6 is a plan view of the vehicle upon which the saw mill is mounted. Fig. 7 is a sectional view on the line 7—7 of Fig. 2.

Similar characters refer to similar parts throughout the views.

The vehicle, upon which I mount the mechanism hereinafter described, may include suitable framework 1; rear wheels 2 secured to a common axle 3 to serve as the drive wheels of the vehicle, and wheels 4, the axle 5 of which is pivoted to swing about pivot pin 6 carried by the framework 1, the latter wheels serving as the steering wheels of the vehicle.

Upon the framework 1, I provide a platform 7 which may carry a seat 8 for the operator, a steering wheel 9 and standard 10 being disposed in convenient proximity to the seat. The standard 10 extends through the platform 7, is rotatable with respect thereto, and carries at its lower end a friction pulley 11. The axle 5 is provided with an eye 12 adjacent to each wheel 4 and a flexible member 13, having its ends secured to said eye, is trained successively about guide pulleys 14 and coiled several times about pulley 11, so that when the wheel 9 is moved circumferentially, the flexible member 13 transmits movement to the axle 5, for steering the vehicle.

At a slightly lower plane than the platform 7, with respect to the framework 1, I provide a second platform 15 rigidly carried by the latter and provided with a track 16. Supported by this platform and mounted superadjacent thereto, I provide a movable platform 17, pivoted as at 18 and provided with a plurality of rollers 19 disposed in operative relation to the track 16 in order that the platform 17 may be easily swung about its pivotal means. I prefer to so dispose platform 17 that it will form a continuation of platform 7.

Upon platform 17 I mount a gas engine 20, or any other suitable motion producing means, such device, through gears 21 and 22, driving a transversely extending shaft 23, carried by bearing box 24, also mounted upon the platform. At one end, laterally of the vehicle, the shaft 23 carries a beveled gear 25 and a rope drum 26. For co-action with gear 25, I provide a gear 27, keyed to a shaft 28, the latter being provided with a squared end 29 and rotatably carried by platform 17 through bearings 30. The hub of one of the rear wheels 2 also carries a beveled gear 31, a shaft 32, carrying a bevel gear 33 for co-action with gear 31, being so disposed by bearings 34 secured to platform 7, as to be in alinement with shaft 28 when the platform 17 is positioned with the shaft 23 disposed transversely as shown in Fig. 5 of the drawing. This shaft 32 is provided with an axially movable clutch 34' for co-action with the squared portion 29 of shaft 28, the clutch being operated by means of a suitable lever 35, so that the two shafts 28 and 32 may be coupled together to act in unison when they are axially alined. Thus, the vehicle may be driven by means of the device 20, when such is desired. The platform 7 may carry a flange 36 which overlaps the margin of platform 17 and prevents tilting thereof, and I may provide a locking device 37, clearly disclosed in Figs. 2 and 5 of the drawing, whereby the platform 17 may be rigidly held with shafts 28 and 32 alined. The platform 17 also carries a base 38 pivotally carrying a standard 39. This standard may be swung in a vertical plane at substantially right angles to the axis of shaft 23, or be rigidly held in connection with platform 17 by the foot 40, rigid with standard 39, and the latch 41, longitudinally movable upon platform 17 and adapted to slide under foot 40 and be bolted in this position, as shown in Fig. 5 of the drawing. I may find it desirable to provide a nut and bolt connection 42 directly between foot 40 and latch 41.

The standard 39 carries suitable supporting framework, designated generally by 43, for carrying the cross cut saw 44, which is movable with respect to the standard. The preferred means for producing movement between the framework 43 and standard 39 is by slotting the latter as at 45 and providing bolts 46 on the framework 43, adapted to pass through the said slot 45, nuts 47 for the said bolts clamping the two parts together, in any position of adjustment.

To facilitate movement of the framework 43 with respect to standard 39, I provide a drum 48 on the latter, rotatable by means of crank 49 and adapted to wind upon itself a flexible member 50, trained over sleeve 51 and secured to the framework 43. A pawl and ratchet mechanism 52 may be provided to normally prevent movement of the drum to lower the framework.

It will be noted that the tendency of the framework 43, owing to its weight, is to swing the standard 39 forwardly of the vehicle, and this is counteracted by foot 40 and bolt 41, or when such is not brought into use, and it is desirable to gradually allow the standard 39 to swing forwardly or to draw it rearwardly, I provide the drum 53, rotatable by crank 54, and which is designed to wind upon itself the flexible member 55 secured to the standard 39, as clearly shown in Fig. 2 of the drawings.

Referring more particularly to the framework 43 and associated parts, this frame includes a longitudinally extending portion 56, joining an upright portion 57, at substantially a right angle, the latter portion being that next adjacent to the standard 39. Pivoted with its axis of oscillation alined to that of standard 39 is a brace rod 58 having a slotted end 59 which receives a bolt 60 entering the portion 56 of the framework and by which the said framework is stabilized.

The framework portion 56 carries two oscillatable yokes 61, receiving the oscillatable rods 62, weighted as at 63 to give inertia to the same. Adjacent to the lower ends of rods 62, the framework 64 of cross cut saw 44 is carried in such a manner as to be swung with respect thereto in order that the mill may be used for felling trees or sawing the same into logs. Movement is imparted to the framework 64 by operatively connecting one of the rods 62 by means of connecting rod 65 to a crank 66, carried by shaft 23.

Referring more specifically to framework 64 and appertaining parts, the saw 44 is carried by suitably bifurcated devices 67 rigid with framework 64, a bolt 68 at each end of such devices passing through an enlarged aperture in the ends of rods 62, a bolt 68 for each nut 69 holding the several parts in operative relation to each other.

It is understood that I may substitute any other suitable devices for those designated by character 67, and that other means may be utilized for operatively connecting the saw frame 64 to the rods 62, without departing from the spirit of my invention.

When the device is to be used for felling trees, as disclosed in Fig. 2 of the drawing, the saw frame is swung so that the saw 44 lies in substantially a horizontal plane, an arm 70, having a hooked end 71 for slidably supporting the saw frame 64, being adjustably carried by the framework 43. The adjustment of rod 70 may be provided for by passing the rod through a vertically disposed slot 72 in a block 73, carried by frame portion 56, a set bolt 74 being provided to hold the arm in its desired adjusted position. It will be readily seen that this rod 70 may, to a limited extent, by its positioning, determine the angle to the horizontal to which the cut is made by the saw. When the saw is in the position above referred to, I find it desirable to provide a guide device for the saw intermediate its ends, in order that there will be no material sag at such portion. This guide device may consist in an adjustable arm 75, which may be moved to and from the saw and retained in a set position with framework 43, in a manner similar to that disclosed with arm 70. This arm 75 carries rollers 76 which engage the saw laterally and permit its free movement with respect thereto, but support it, as clearly shown in Fig. 2 of the drawing.

When the mill is to be used for sawing logs transversely, the framework 64 is swung so as to position the saw 44 in an upright position transversely, the arms 70 and 75 being pushed away from and out of operative relation to the frame 64, as disclosed in Figs. 1 and 5 of the drawings. Rods 62 carry bifurcated guide devices 77 which may be swung into position with a portion of the framework 64 intermediate the bifurcations thereof. Thus, the framework 64 is guided for sawing as described, the guide devices 77 may be swung out of position when the device is used as disclosed in Fig. 2 of the drawings.

The operation of the device is as follows: The mill may be self transported to the place of action by its operative power, this being accomplished as described, by positioning the shafts 28 and 32 in alinement, and operatively connecting them together that action of device 20 will impart movement to the wheels 2. The vehicle may be steered as described. For felling trees, the saw frame 64 is positioned as shown in Fig. 2 of the drawings. The place where the cut is to be made being determined, the frame 43 is raised or lowered by crank 49 to position the saw 44 at such place. Clutch 34 is thrown out of operation, the device 20 then oscillating rods 62 which reciprocate saw 44, while it is fed into the wood by swinging the device with its platform 17. For sawing into logs, the framework 64 is positioned as disclosed in Figs. 1 and 5, and the saw may be fed by means of crank 54 which tilts the standard 39 as described. If desirable, the vehicle may be placed parallel to the tree trunk and the saw turned by means of platform 17, at right angles to the axis thereof, whereby the vehicle may be quickly advanced along the side of the trunk after each transverse cut.

I claim:

A cross cut saw mill comprising in combination, a supporting structure, an upright mounted on said structure, a frame having a vertical member adjustably supported on said upright and a horizontal member having a laterally disposed U-shaped central portion and open bearing frames, rod supports pivotally mounted in said bearing frames, rods mounted in said supports, a saw frame mounted in said rods, a cross cut saw having its ends secured in said saw frame, means carried by said horizontal member for slidably supporting said saw frame to hold the saw in an operative position, and means connected with one of said rods for reciprocating the saw, substantially as described.

In testimony whereof I affix my signature in presence of two witnesses.

ALEXANDER BRAZIER.

Witnesses:
   F. P. Schroeder,
   M. M. Escherich.